United States Patent [19]

Grässer

[11] Patent Number: 5,567,178
[45] Date of Patent: Oct. 22, 1996

[54] APPARATUS FOR THE ARRANGEMENT OF PATCH PANELS, SUPPORTING OPTICAL WAVEGUIDE PLUG SYSTEMS

[76] Inventor: Edmond Grässer, Rossbergstrasse 3, 67269 Grünstadt, Germany

[21] Appl. No.: 237,135

[22] Filed: May 3, 1994

[30] Foreign Application Priority Data

| May 17, 1993 | [DE] | Germany | 93 07 334.8 U |
| Aug. 20, 1993 | [DE] | Germany | 93 12 492.9 U |
| Sep. 3, 1993 | [DE] | Germany | 93 13 279.4 U |
| Dec. 11, 1993 | [EP] | European Pat. Off. | 93120049 |

[51] Int. Cl.$^6$ ................................................. A47F 5/00
[52] U.S. Cl. ................................. 439/532; 211/94
[58] Field of Search ............................. 439/532, 540, 439/716; 211/94, 162; 361/826–828; 385/135, 139

[56] References Cited

U.S. PATENT DOCUMENTS

| 2,572,617 | 10/1951 | Havry et al. | 211/94 |
| 4,972,298 | 11/1990 | Casa et al. | 361/827 |
| 5,001,602 | 3/1991 | Suff et al. | 361/827 |
| 5,108,313 | 4/1992 | Adams | 439/610 |
| 5,129,842 | 7/1992 | Morgan et al. | 439/532 |
| 5,148,925 | 9/1992 | Althoff et al. | 211/94 |
| 5,332,108 | 6/1994 | Blass | 211/94 |
| 5,430,823 | 7/1995 | Dupont et al. | 385/135 |

FOREIGN PATENT DOCUMENTS

| 0162373 | 11/1985 | European Pat. Off. |
| 79769 | 2/1971 | German Dem. Rep. |
| 1987195 | 6/1968 | Germany. |
| 1591623 | 7/1970 | Germany. |
| 1640904 | 12/1970 | Germany. |
| 3033928 | 3/1982 | Germany. |
| 2854624 | 6/1984 | Germany. |
| 8633613 | 4/1987 | Germany. |
| 3806136 | 9/1989 | Germany. |
| 681941 | 6/1993 | Switzerland. |

*Primary Examiner*—Neil Abrams
*Attorney, Agent, or Firm*—Horst M. Kasper

[57] ABSTRACT

An apparatus for the arrangement of patch panels (5, 48) which support optical waveguide plug systems, such as couplings or plugs, preferably within a distribution rack and patch panel cabinet (1) in 19-inch rack technology. Two horizontally running U-shaped rails (3, 4) are furnished in each case with longitudinal slots (30''', 40''') disposed with their openings facing each other and on top of each other in a vertical direction. The U-shaped rails (3, 4) are horizontally supported at their ends within the distribution rack and patch panel cabinet (1). The patch panel (5) is received with its longitudinal edges between the U-shaped rails (3, 4). The arms (3', 3'') of the upper U-shaped rails (3) are longer than the arms (4', 4'') of the lower U-shaped rails (4). The width (a) of the patch panel (5, 48) is larger than the open distance (b) between the two outermost edges (30, 40), disposed facing each other, of the arms (3, 3'', 4, 4') of the upper and lower U-shaped rails (3, 4), however smaller than the open distance (c) of the rail floors (30', 40') from each other. There are preferred the U-shaped rails (43, 43') which are part of a frame plate (41), and which are preferably an integral part of a frame plate. The frame plate (41) defines a rectangular recess (47) for receiving the patch panel (48). Distributor boxes (12, 12', 53) can be disposed at the patch panels (5, 48).

29 Claims, 4 Drawing Sheets

APPARATUS FOR THE ARRANGEMENT OF PATCH PANELS, SUPPORTING OPTICAL WAVEGUIDE PLUG SYSTEMS

BACKGROUND OF THE INVENTION

1. Field of the Invention

The invention relates to an apparatus for the placing of patch panels, where the patch panels support optical waveguide plug systems, such as couplings and/or plugs and/or optical waveguide cables, preferably within a distribution rack or patch panel cabinet and, in particular, in 19-inch rack technology.

2. Brief Description of the Background of the Invention Including Prior Art

Distribution racks or patch panel cabinets for optical waveguide plugs and optical waveguide couplings are known which are superposed to each other in cuboid-shaped plug-in boxes, in particular in 19-inch rack technology. An assembly chassis is disposed inside the distribution rack or patch panel cabinet, where the distributor boxes are fastened with screws tightly to the assembly chassis. This assembly chassis can be casings, such as it is known, where support sheet metal pieces are screwed to vertically disposed, perforated rails, where the support sheet metal pieces hold the distributor boxes. Conventionally, the distributor boxes exhibit a front sheet metal piece or, respectively, a distributor sheet metal piece. A number of side-by-side disposed recesses are furnished in the front sheet metal piece or, respectively, the distributor sheet metal piece. Plugs or, respectively, couplings are disposed in the recesses. The cables of the connection parts, disposed in the front sheet metal piece, are led away towards the rear. The cables of the plugged-on connection parts are led sideways approximately horizontally toward the side, or the cables of the plugged-in parts are plugged and led directly below the front sheet metal piece through a cable guide also into the interior of the distribution rack or patch panel cabinet.

The conventional assembly of such plug systems in a distribution rack or patch panel cabinet, preferably under use of distributor boxes, has proven to be insufficient, because a plurality of cables has to be placed inside the distribution rack or patch panel cabinet. The trunk cables assume in addition a relatively large volume and are stiff and they cannot have a bending radius which is smaller than a certain limit value. In addition, it can occur that a length of several meters of the trunk cable or of the jumper cable of one connection or of several connections have to be placed within a distribution rack or patch panel cabinet, which creates substantial problems. In addition, extensive manipulations are required for the exchange of a distributor box in order to demount the distributor box from the assembled system in case the plug system has to be changed.

A cabling and installation system or, respectively, a transfer system for plants furnished with optical waveguides is known from the German Patent document DE-U1-9,210, 644.7 and the German patent document DE-U1-9,210,645.5. In these references, the connection positions are spatially separated from each other. These known systems comprise a plurality of cabinets or racks receiving individual connection casings. An optical waveguide bundle, combined to a cable, joins into each connection casing inside of the connection casing. The optical waveguides are subdivided inside the connection casing and are connected in a tension-proof way to connection couplings, disposed at a front plate of the connection casing. The supports as well as the connection casings are solidly screwed to the cabinets or racks.

SUMMARY OF THE INVENTION

1. Purposes of the Invention

It is an object of the present invention to provide an apparatus of the recited kind, which allows to assemble and to disassemble patch panels and thus optical waveguide plug systems disposed on the patch panels in a simple way.

It is another object of the present invention to provide a better accessibility to the distribution rack or patch panel cabinet, where the cables are coordinated and positioned in an orderly way relative to the patch panels or, in case of distributor boxes, relative to the distributor boxes.

It is yet a further object of the present invention to provide a distribution rack or patch panel cabinet, where the space-saving distributor boxes are provided and with an improved subdivision of the plug systems.

These and other objects and advantages of the present invention will become evident from the description which follows.

2. Brief Description of the Invention

According to the present invention, there is provided for an apparatus for the arrangement of patch panels. An upper horizontally running U-shaped rail has two ends and is furnished with two arms, directed downwardly, and with a longitudinal slot, open in downward direction and formed by the two downwardly directed arms. A first rail floor is disposed at the bottom of the longitudinal slot open in downward direction. The upper U-shaped rail is horizontally supported at the two ends within a distribution rack and patch panel cabinet. A lower horizontally running U-shaped rail has two ends and is furnished with two arms, directed upwardly, and with a longitudinal slot, open in upward direction and formed by the two upwardly directed arms. A second rail floor is disposed at the bottom of the longitudinal slot open in upward direction. The lower U-shaped rail is horizontally supported at the two ends within the distribution rack and patch panel cabinet. The upper horizontally running U-shaped rail and the lower horizontally running U-shaped rail are disposed facing each other with open sides of the longitudinal slots. Lower edges of the two arms directed downwardly and upper edges of the two arms directed upwardly are disposed facing each other. The upper horizontally running U-shaped rail and the lower horizontally running U-shaped rail are disposed on top of each other in a vertical direction. A patch panel has longitudinal edges and is received with its longitudinal edges between the upper U-shaped rail and the lower U-shaped rail. A first flat rail is fixedly disposed at a lower part of the patch panel, and a second flat rail is fixedly disposed at an upper part of the patch panel. A patch panel assembly is formed by the patch panel with the first flat rail and the second flat rail. The two arms directed downwardly of the upper U-shaped rail are longer than the two arms directed upwardly of the lower U-shaped rails. The width of the patch panel assembly extending in a vertical direction is larger than an open distance between the lower edges of the two arms directed downwardly and the upper edges of the two arms directed upwardly. However, the width of the patch panel extending in a vertical direction is smaller than an open distance of the first rail floor from the second rail floor.

The distribution rack and patch panel cabinet can be produced in 19-inch rack technology. The patch panels can support optical waveguide plug systems including couplings and plugs and optical waveguide cables disposed within the distribution rack and patch panel cabinet.

The upper U-shaped rail and the lower U-shaped rail can be part of a frame plate. The frame plate can exhibit a rectangular recess for receiving the patch panel.

The upper U-shaped rail and the lower U-shaped rail can be an integral part of the frame plate. The frame plate can be furnished with an upper connection web for forming the upper U-shaped rail and with a lower connection web for forming the lower U-shaped rail. The upper connection web can exhibit an upper web bent rearwardly at a right angle, wherein an upper angle rail is disposed inside the upper web under providing a distance to the upper connection web and under formation of an upper U-shaped longitudinal opening. The lower connection web can exhibit a lower web bent rearwardly at a right angle. A lower angle rail can be disposed inside the lower web under providing a distance to the lower connection web and under formation of a lower U-shaped longitudinal opening.

A longitudinal edge of the upper angle rail can face a longitudinal edge of the lower angle rail. A longitudinal edge of the upper connection web can face a longitudinal edge of the lower connection web. The longitudinal edge of the upper angle rail can project further downward than the longitudinal edge of the upper connection web. The longitudinal edge of the lower angle rail can project further upward than the longitudinal edge of the lower connection web.

A distributor box can be disposed at the patch panel. The distributor box can be formed as a parallelepiped having a rear end. The distributor box can include a part, narrowing rearwardly at the rear end of the parallelepiped disposed remote from the patch panel as viewed from above. The part is preferably of a trapezoidal shape.

The patch panel can exhibit in each case on top an upper projecting arm and below a lower projecting arm. The upper projecting arm and the lower projecting arm can be running longitudinally and can be bent at a right angle relative to an adjacent surface of the distributor box. An upper horizontally disposed longitudinal rail arm and an upper vertically disposed longitudinal rail arm can be disposed at a right angle to each other. The upper horizontally disposed longitudinal rail arm can be mounted on the upper projecting arm. The upper vertically disposed longitudinal arm can protrude into the upper U-shaped rail. The upper vertically disposed longitudinal arm can project beyond longitudinal edges of the upper U-shaped rail. A lower horizontally disposed longitudinal rail arm and a lower vertically disposed longitudinal rail arm can be disposed at a right angle to each other. The lower horizontally disposed longitudinal rail arm can be mounted on the lower projecting arm. The lower vertically disposed longitudinal arm can protrude into the lower U-shaped rail. The lower vertically disposed longitudinal arm can project beyond longitudinal edges of the lower U-shaped rail. The distributor box can be mounted between the upper projecting arm and the lower projecting arm.

Vertical perforated rails can be disposed in a side-door region inside of the distribution rack and patch panel cabinet. The upper U-shaped rail and the lower U-shaped rail can be supported with their ends at the perforated rails.

A distributor box can be attached to the patch panel and include an elongated, upwardly open slot in a rear narrow faceplate for allowing insertion and for allowing tension relief of a cable support of a trunk cable or of a feed cable.

Two patch panels and two distributor boxes, respectively, can be disposed next to each other in the upper U-shaped rail and the coordinated lower U-shaped rail. Preferably eight optical waveguide plugs and eight optical waveguide couplings, respectively, are disposed within each patch panel.

A distributor box can be attached to the patch panel. A cable coming from the distributor box can be wound up on a cable roll. The cable roll can be disposed in the neighborhood of the distributor box within the distribution rack and patch panel cabinet.

Additional cable rolls can be provided for receiving trunk cables and/or jumper cables and can be disposed within a space created by a trapezoidally shaped and rearwardly tapering formation of the distributor box within the distribution rack and patch panel cabinet.

An upper flat rail can be assembled on top of the patch panel. The upper flat rail can project beyond an upper longitudinal edge of the patch panel. A lower flat rail can be assembled on top of the patch panel. The lower flat rail can project beyond a lower longitudinal edge of the patch panel. The combined width of the patch panel together with the upper flat rail and the lower flat rail can be larger than the open distance between the second rail floor and the lower edges of the two arms directed downwardly. The two arms directed downwardly can face the two arms directed upwardly. However, the combined width of the patch panel together with the upper flat rail and the lower flat rail can be less than the open distance between the upper edges of the two arms directed upwardly and the first rail floor.

The combined width of the patch panel together with the upper flat rail and the lower flat rail can be larger than the open distance between the lower edges of the two arms directed downwardly and the upper edges of the two arms directed upwardly. The two arms directed downwardly can be facing the two arms directed upwardly. However, the combined width of the patch panel together with the upper flat rail and the lower flat rail can be less than the open distance between the first rail floor and the second rail floor.

A removable blocking strip can be placed on the upper flat rail between an upper edge of the patch panel and a lower edge of an outer front arm of the two arms directed downwardly of the upper U-shaped rail for obtaining a solid support and removal of the patch panel and of the distributor boxes, respectively, disposed within the distribution rack and patch panel cabinet.

According to a preferred embodiment of the invention there is provided for an apparatus for the arrangement of plug-in supports, where the plug-in supports receive optical waveguide plug systems, such as couplings and/or plugs, and/or optical waveguide cables. A distribution rack and patch panel cabinet exhibits door regions. An upper horizontally running U-shaped rail includes a longitudinal slot, a rail floor, and arms. A lower horizontally running U-shaped rail includes a longitudinal slot, a rail floor, and arms. The upper horizontally running U-shaped rail is disposed with its longitudinal slot facing the longitudinal slot of the lower horizontally running U-shaped rail. The upper horizontally running U-shaped rail is disposed on top of the lower horizontally running U-shaped rail in a vertical direction. The upper horizontally running U-shaped rail and the lower horizontally running U-shaped rail are horizontally supported at their ends within the distribution rack and patch panel cabinet in the door regions. A plug-in support is received with upper and lower longitudinal edges between the upper horizontally running U-shaped rail and the lower horizontally running U-shaped rail. The arms of the upper U-shaped rail are longer than the arms of the lower U-shaped rail. The width of the plug-in support is larger than an open distance between the two outermost edges of the arms of the upper U-shaped rail facing the two outermost edges of the arms of the lower U-shaped rail. However, the width of the plug-in support is smaller than the open distance of the rail floor of the upper U-shaped rail from the rail floor of the lower U-shaped rail for hanging the plug-in supports in between the upper U-shaped rail and the lower U-shaped rail.

The upper U-shaped rail and the lower U-shaped rail can be part of a frame plate. The frame plate can exhibit a rectangular recess for receiving the plug-in supports.

It is possible by employing the invention to hang and insert patch panels with or without distributor boxes or, in general, insertion supports with a front plate or patch panel into the rails from the rear or from the front without having to loosen any screws. The patch panel is inserted with its upper longitudinal edge into the longitudinal slot of the upper U-shaped rail. Then, the lower edge of the patch panel is swiveled over the longitudinal slot of the lower U-shaped rail and the patch panel or, respectively, the distributor box is lowered into the longitudinal slot until also the lower edge of the patch panel or, respectively, of the distributor box is resting inside the longitudinal slot of the lower U-shaped rail. Because the arms of the upper U-shaped rail are longer than the arms of the lower U-shaped rail, the upper edge of the patch panel or, respectively, of the distributor box can no longer slide out of the longitudinal slot of the upper U-shaped rail, but the patch panel or, respectively, the distributor box is securely supported between the U-shaped rails.

In each case a flat rail or plate rail can be mounted to the patch panel at the bottom and on the top, where the flat rails protrude beyond the longitudinal edges of the patch panel. The width a of the patch panel together with the flat rails is larger than the open width b of the two outermost edges, facing each other, of the arms of the upper U-shaped rail and of the lower U-shaped rail, however, smaller than the open distance c of the rail bases between each other. Advantageously, the U-shaped rails are part of a frame plate, preferably an integral part of the frame plate, where the frame plate exhibits a rectangular recess for receiving the patch panel or the distributor box.

Advantageously, one blocking strip is disengageably placed, for example clipped by way of a clipping mechanism, at least onto the upper flat rail between the upper edge of the patch panel and the lower edge of the outer, door-side arm of the upper U-shaped rail for a firm support of the patch panels or, respectively, of the distributor boxes or of the plug-in supports. As soon as the blocking strip is mounted from the outside to the door side, a removal of the patch panel or, respectively, of the distributor box is no longer possible. For this purpose, the blocking strip has first to be removed in order to be able to remove the patch panel or, respectively, the distributor box from its supports.

The apparatus is in addition associated with the advantage that the trunk cables and the jumper cables, present within the distribution racks or patch panel cabinets, are wound up and arranged in an orderly and neat manner such that the plug systems or similar connection elements for the optical waveguides can be easily and quickly exchanged or changed within the distribution rack or patch panel cabinet in a surveillable way. In addition, the invention allows a more space-saving, more compact series arrangement of couplings and/or plugs or connection elements in one row. For example, eight couplings and/or plugs or connection elements can be provided for each patch panel.

Distributor boxes can be arranged at the patch panels, where the distributor boxes protrude into the interior of the distribution racks or patch panel cabinets. In this case, the patch panels represent the front plates of the distributor boxes, which advantageously serve for the protection of the couplings and/or plugs or connection elements disposed at the patch panels, in particular during times of transport as well as for the support, for the holding or bracing and the tension relief of the optical waveguide cables. Insertion supports, preferably distributor boxes, can be supported based on the construction provided according to the present invention.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

According to the present invention, there is provided an apparatus for the arrangement of patch panels 5, 48 which support optical waveguide plug systems, such as couplings and/or plugs and/or optical waveguide cables 13, 14, 17, 18, preferably within a distribution rack and patch panel cabinet 1 and in particular produced in 19-inch rack technology. In each case two horizontally running U-shaped rails 3, 4 are furnished with longitudinal slots 30''', 40'''. Said longitudinal slots 30''', 40''', are disposed facing each other with the openings and are disposed on top of each other in a vertical direction. The U-shaped rails 3, 4 are horizontally supported at their ends within the distribution rack and patch panel cabinet 1. The patch panel 5 is received with its longitudinal edges between the U-shaped rails 3, 4. The arms 3', 3" of the upper U-shaped rails 3 are longer than the arms 4', 4" of the lower U-shaped rails 4. The width a of the patch panel 5, 48 is larger than the open distance b between the two outermost edges 30, 40, disposed facing each other, of the arms 3', 3", 4', 4" of the upper and lower U-shaped rails 3, 4, however, smaller than the open distance c of the rail floors 30', 40' from each other.

The U-shaped rails 43, 43' can be part of a frame plate 41, preferably an integral part of a frame plate. The frame plate 41 can exhibit a rectangular recess 47 for receiving the patch panel 48.

Figure 5:
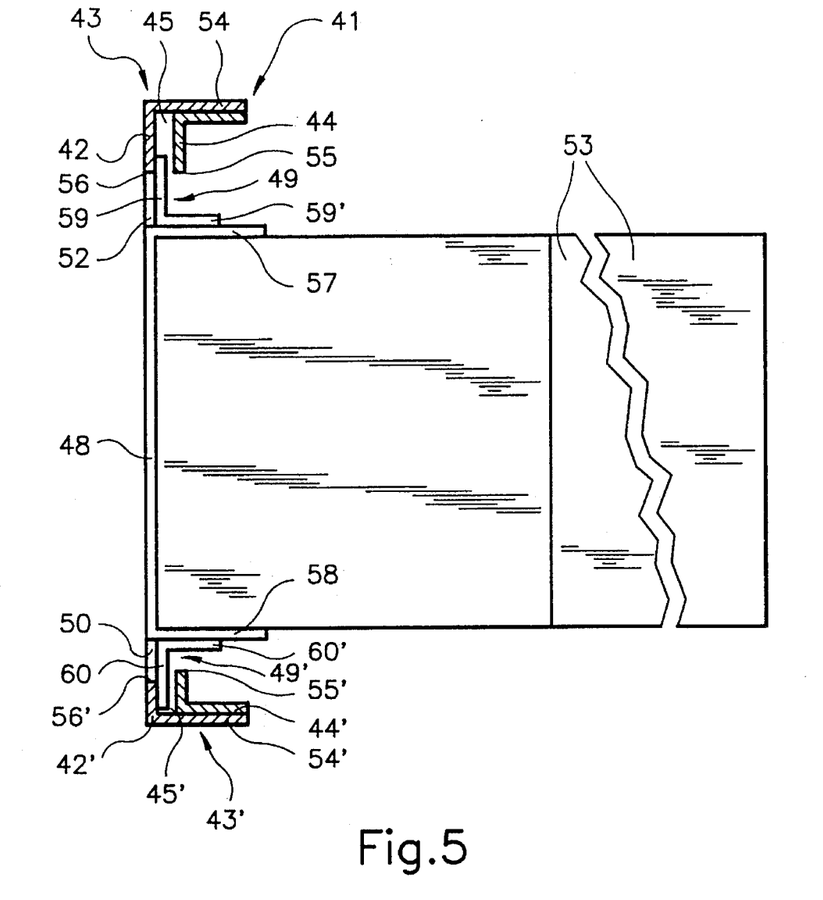
FIG. 5 is a vertical sectional view through a frame with recess, where a patch panel, blocked with a blocking strip against removal, is inserted in the recess of the frame, where the patch panel carries a distributor box, where the distributor box together with the patch panel and together with the parts attached to the patch panel are shown without shading for purposes of simplicity, surveillability, and clarity.

It is shown in FIG. 5 that the frame plate 41 can be furnished with an upper connection web 42 and with a lower connection web 42' for forming the U-shaped rails 43, 43'. The connection webs 42, 42' can exhibit in each case a web 54, 54' bent rearwardly at a right angle. In each case an angle rail 44, 44' can be disposed inside at the webs 54, 54' under providing a distance to the connection web 42, 42' and under formation of U-shaped longitudinal openings 45, 45'. The longitudinal edges 55, 55', disposed facing each other, of the angle rails 44, 44' can project over the longitudinal edges 56, 56', disposed facing each other, of the upper connection web 42 and of the lower connection web 42'.

A distributor box 12, 12', 53 can be disposed at the patch panel 5, 48 The distributor box 12, 12' 53 can be formed as a parallelepiped. The distributor box 12, 12', 53 can exhibit a part 64, tapering towards the rear end of the parallelepiped disposed remote from the patch panel 5, 48 as viewed from above. Said part 64 is preferably of a trapezoidal shape.

The patch panel 48 can exhibit in each case on top and below an arm 57, 58, running longitudinally and bent at a right angle as shown in FIG. 5. A rail 49, 49' with two longitudinal arms 59, 59', 60, 60', disposed at a right angle to each other, can be mounted on the arms 57, 58. The vertically running longitudinal arms 59, 60 of the longitudinal arms 59, 59', 60, 60' can protrude into the U-shaped longitudinal openings 45, 45'. The longitudinal arms 59, 60 can project over the inner longitudinal edges 56, 56', 55, 55' of the frame plate 41. The distributor box 53 can be mounted between the arms 57, 58.

Vertical perforated rails 2, 2' can be disposed in a side-door region inside of the distribution rack and patch panel cabinet 1. The U-shaped rails 3, 4 can be supported with their ends at the perforated rails 2, 2'. A distributor box can exhibit in a rear narrow faceplate 63 an elongated, upwardly open slot 62 for insertion and for tension relief of a cable support of a trunk cable or of a feed cable 13, 14.

The two patch panels 5 or, respectively, two distributor boxes 12, 12' can be disposed next to each other in two coordinated U-shaped rails 3, 4. Preferably eight optical waveguide plugs or, respectively, eight optical waveguide couplings are disposed within each patch panel 5.

The cables 13, 14 coming from the distributor boxes 12, 12', 53, in particular, trunk cables, can be wound up on cable rolls 15, 16. The cable rolls 15, 16 can be disposed in the neighborhood of the distributor boxes 12, 12' within the distribution rack and patch panel cabinet 1. Further cable rolls 19, 19', 20, 20', 21 21', in particular for receiving trunk cables and/or jumper cables 13, 14, 17, 18, can be disposed within a space created by a trapezoidally shaped and rearwardly tapering formation of the distributor boxes 12, 12', 53 within the distribution rack and patch panel cabinet 1.

In each case a flat rail 6, 7 can be assembled on top and bottom of the patch panel 5. The flat rails 6, 7 can project over the longitudinal edges of the patch panel 5. The width a of the patch panel 5 together with the flat rails 6, 7 can be larger than the open distance b of the two outer edges 30, 40, disposed facing each other, of the arms 3', 3", 4', 4" of the upper and lower U-shaped rails 3, 4, however, less than the open distance c of the rail floors 30', 40', from each other At least a removable blocking strip 8 can be placed on the upper flat rail 7 between the upper edge of the patch panel 5 and the lower edge 30 of the outer, door-side arm 3" of the upper U-shaped rail 3 and for a solid support and removal of the patch panel 5 or, respectively, of the distributor boxes 12, 12' within the distribution rack and patch panel cabinet 1.

According to a preferred embodiment of the invention, there is provided an apparatus for the arrangement of plug-in supports 12, 12', 53 which receive optical waveguide plug systems, such as couplings and/or plugs, and/or optical waveguide cables 13, 14, 17, 18, preferably within a distribution rack and patch panel cabinet 1 and in particular produced in 19-inch rack technology. The plug-in supports 12, 12', 53 can be distributor boxes. In each case two horizontally running U-shaped rails 3, 4 are disposed with their longitudinal slots 30''', 40''' facing each other and on top of each other in a vertical direction and are horizontally supported at their ends within the distribution rack and patch panel cabinet 1 in the door regions. The plug-in support 12, 12', 53 is received with upper and lower longitudinal edges between the two horizontally running U-shaped rails 3, 4. The arms 3', 3", 42, 44 of the upper U-shaped rail 3, 43 are longer than the arms 4', 4", 42', 44' of the lower U-shaped rail 4, 43'. A width a of the plug-in support 12, 12', 53 is larger than an open distance b between the two outermost edges 30, 40, 55, 55', 56, 56' disposed facing each other, of the arms 3', 3", 42, 44; 4', 4", 42', 44' of the upper and lower U-shaped rails 3, 4, however, smaller than an open distance c of the rail floors 30', 40' of the U-shaped rails 3, 4 from each other, for hanging the plug-in supports 12, 12', 53 in between the two U-shaped rails 3, 4

The U-shaped rails 3, 4 can be part of a frame plate 41. The frame plate 41 can exhibit a rectangular recess 47 for receiving the plug-in supports 12, 12', 53.

Figure 1:
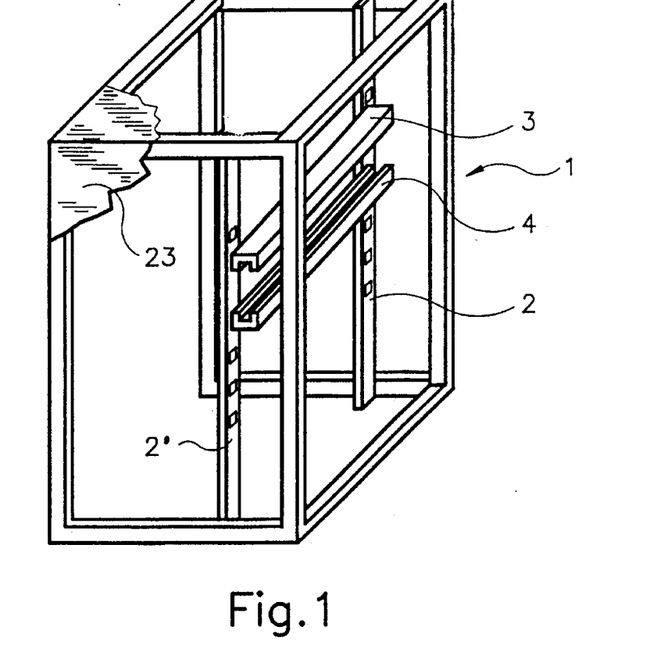
FIG. 1 is a perspective schematic view of a distribution rack or patch panel cabinet with two U-shaped rails, disposed facing each other, according to the invention without patch panels or distributor boxes.
Figure 2:
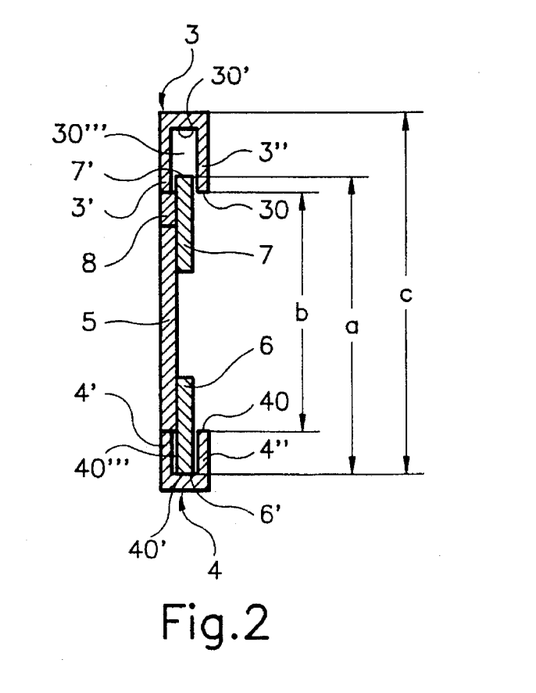
FIG. 2 is a sectional view of two U-shaped rails, where a patch panel is supported between the two U-shaped rails, with a blocking strip, where, however, couplings or plugs are not shown.
Figure 3:
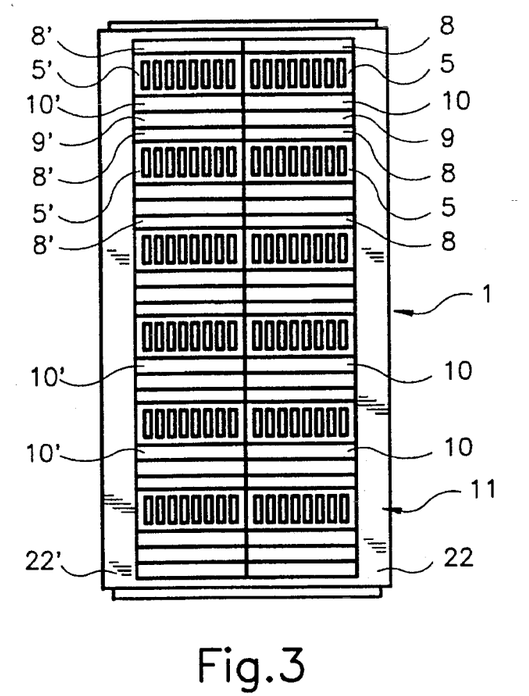
FIG. 3 is a front elevational view of a distribution rack or patch panel cabinet with inserted patch panels.

A distribution rack or patch panel cabinet 1 comprises according to FIGS. 1 and 2 frame parts as well as side walls 23 and a front door 11 (FIG. 3). Two vertically running perforated rails or assembly rails 2, 2' are disposed in the door region within the frame parts, where U-shaped rails 3, 4 are attached with their ends horizontally to the perforated rails or assembly rails 2, 2' as shown in FIG. 1. In each case, one pair of U-shaped rails 3, 4 are necessary for the support of in each case one patch panel 5 with or without distributor box 12, 12' shown in FIG. 4. One pair of U-shaped rails 3, 4 is illustrated in FIG. 1.

FIG. 2 shows a side sectional view of a pair of U-shaped rails 3, 4 with a patch panel plate 5. The U-shaped rails 3, 4 have arms 3', 3" or, respectively, 4', 4" disposed aligned parallel to each other. The U-shaped rails 3, 4 are assembled parallel to each other and on top of each other such that their longitudinal slots 30''', 40''' are disposed facing each other The arms 3', 3" of the upper U-shaped rail 3 are wider or, respectively, longer than to the arms 4', 4" of the lower U-shaped rail 4, which can be recognized from FIG. 2. A patch panel 5 is disposed between the U-shaped rails. A flat rail 6, 7 is in each case mounted longitudinally below and above to the lower part and to the upper part of the patch panel 5, and preferably to the same main surface of the patch panel, wherein the flat rails 6, 7 protrude and project over the longitudinal edges of the patch panel 5 in the width of the flat rail 6, 7. The width a of the patch panel 5 together with the flat rails 6, 7 is larger than the open distance b of the two outermost edges 30, 40, facing each other, of the arms 3, 3' or, respectively, 4, 4' of the upper U-shaped rail and of the lower U-shaped rail 3, 4, however, the width a is smaller than the open distance c of the rail floors 30', 40' between each other. A simple insertion of the patch panel 5, together with a distributor box hanging on the patch panel 5, into the upper longitudinal slots 30''', 40''' is made possible based on the fact that the arms 3', 3'' of the upper U-shaped rails 3 are longer or, respectively, wider in vertical direction than the width of the arms 4', 4'' of the lower U-shaped rail 4. The upper edge 7' of the flat rail 7 is inserted into the longitudinal slot 30''' of the upper U-shaped rail 3 for fitting the flat rail 7 into the upper slot 30'''. Then, the lower edge 6' of the flat rail 6 together with the patch panel 5 is swiveled over and beyond the edge 40 of the lower arm 4'' until the lower edge 6' of the flat rail 6 comes to rest above the longitudinal slot 40''' of the lower U-shaped rail 4. Then, the patch panel 5 is lowered downwardly until the lower edge 6' of the flat rail 6 stands on the rail floor 40', as shown in FIG. 2.

A blocking strip 8 is inserted or, respectively, mounted, and is preferably clipped, to the flat rail 7 from the front into the space between the upper edge of the patch panel 5 and the lower edge 30 of the outer arm 3' of the upper U-shaped rail 3 for the firm assembly of the patch panel 5 or, respectively, of the distributor box. The blocking strip is preferably made out of plastic. Thereupon, it is no longer possible to remove the patch panel 5 or, respectively, the distributor box 12, 12' from within the rail floors 30', 40' of the upper U-shaped rail 3 and the lower U-shaped rail 4. For removal of the patch panel or, respectively, of the distributor box 12, 12', it is again required that the blocking strip 8 be removed first.

Figure 4:
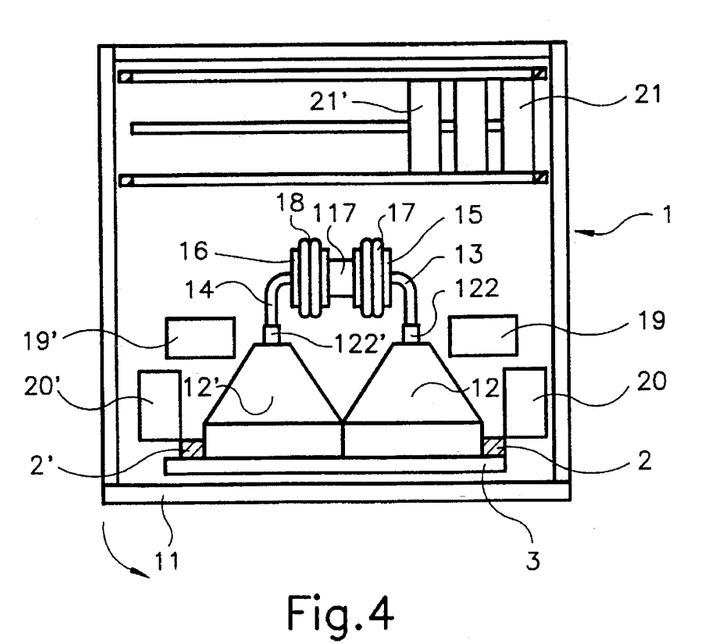
FIG. 4 is a top plan view onto a plane inside the distribution rack or patch panel cabinet with the cover removed in order to show the attachment of a U-shaped rail for supporting two patch panels with distributor boxes.

Preferably, the patch panels 5 are provided subdivided relative to the overall width of the distribution rack or patch panel cabinet 1 according to FIG. 3 such that two patch panels or two distributor boxes are disposed in one plane, as is shown in FIG. 4. Blind or blank panels are designated with reference numerals 9, 9' in FIG. 3 and cable guides are designated with reference numerals 10, 10'. A door 11 exhibits facing structures or veneers 22, 22', which run laterally in longitudinal direction along the door, preferably in a vertical direction, and closes the distribution rack or patch panel cabinet from the front. Preferably, the patch panels or, respectively, the distributor boxes 12, 12' as well as the distribution rack or patch panel cabinet 1 and all accessories are provided in 19-inch rack technology.

FIG. 4 shows a top plan view onto a plane inside of the distribution rack or patch panel cabinet 1 with the front door 11. The two perforated rails 2, 2' are disposed laterally inside the distribution rack or patch panel cabinet 1 in the region near the door 11. The U-shaped rails 3, 4 are mounted horizontally at the two perforated rails 2, 2', where the upper rail 3 of the U-shaped rails 3 and 4 can be recognized from the top plan view of FIG. 4. A distributor box 12, 12' (FIG. 4) is attached to each patch panel 5, as shown in FIG. 2, such that preferably two distributor boxes 12, 12' are supported by one pair of U-shaped rails 3, 4.

The distributor boxes, which can be at least accessible from the front, are formed like a cuboid or parallelepiped. The rear part of the distributor boxes, preferably from a quarter up to a third of the depth, is formed tapered, preferably trapezoidal, narrowing from the front to the rear in the plane of the distributor box or, respectively, in a plan view from above, as shown in FIG. 4. In this way, space is created inside the distribution rack or patch panel cabinet based on the trapezoidal, rearwardly tapering form of the distributor boxes 12, 12'. Cable rolls 19, 19' can be disposed in this space, in particular for the receiving and winding up of trunk cables and/or of jumper cables. The trunk cables 13, 14 of the distributor boxes 12, 12' also lead to cable rolls 15, 16. The cable strands 17, 18 of the respective trunk cables are wound onto the cable rolls 15, 16, as is shown schematically in FIG. 4. As required, additional cable rolls 20, 20' can be disposed in the region of the perforated rails 2, 2' in order to wind up additional cable strands, in particular jumper cables. All cable rolls are supported in a suitable way in the distribution rack or patch panel cabinet and are rotatable for the winding up and the unwinding of the cables. In addition, further cable rolls 21, 21' for the winding up and for the supplying of further cable strands can be disposed in the rear region of the distribution rack or patch panel cabinet, preferably in several superposed planes and on top of each other.

Figure 6:
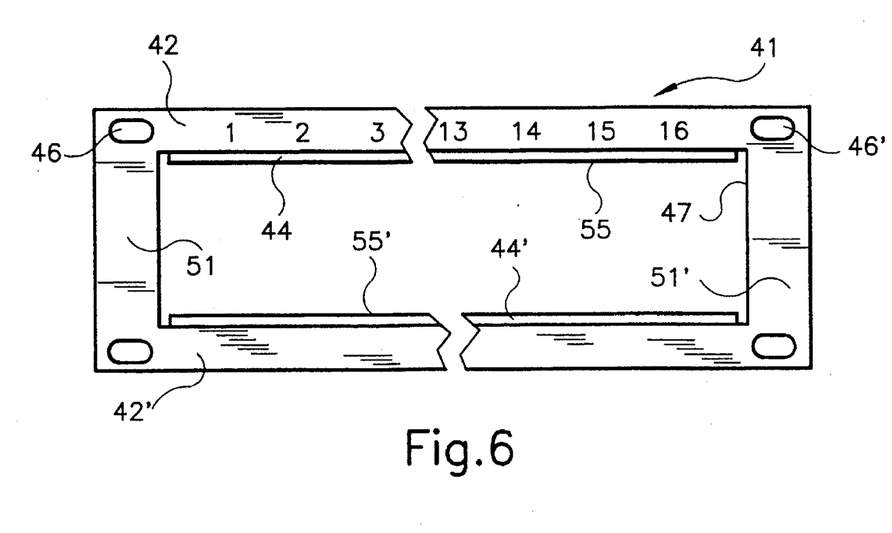
FIG. 6 is a view of the frame of FIG. 5 without patch panel.
Figure 7:
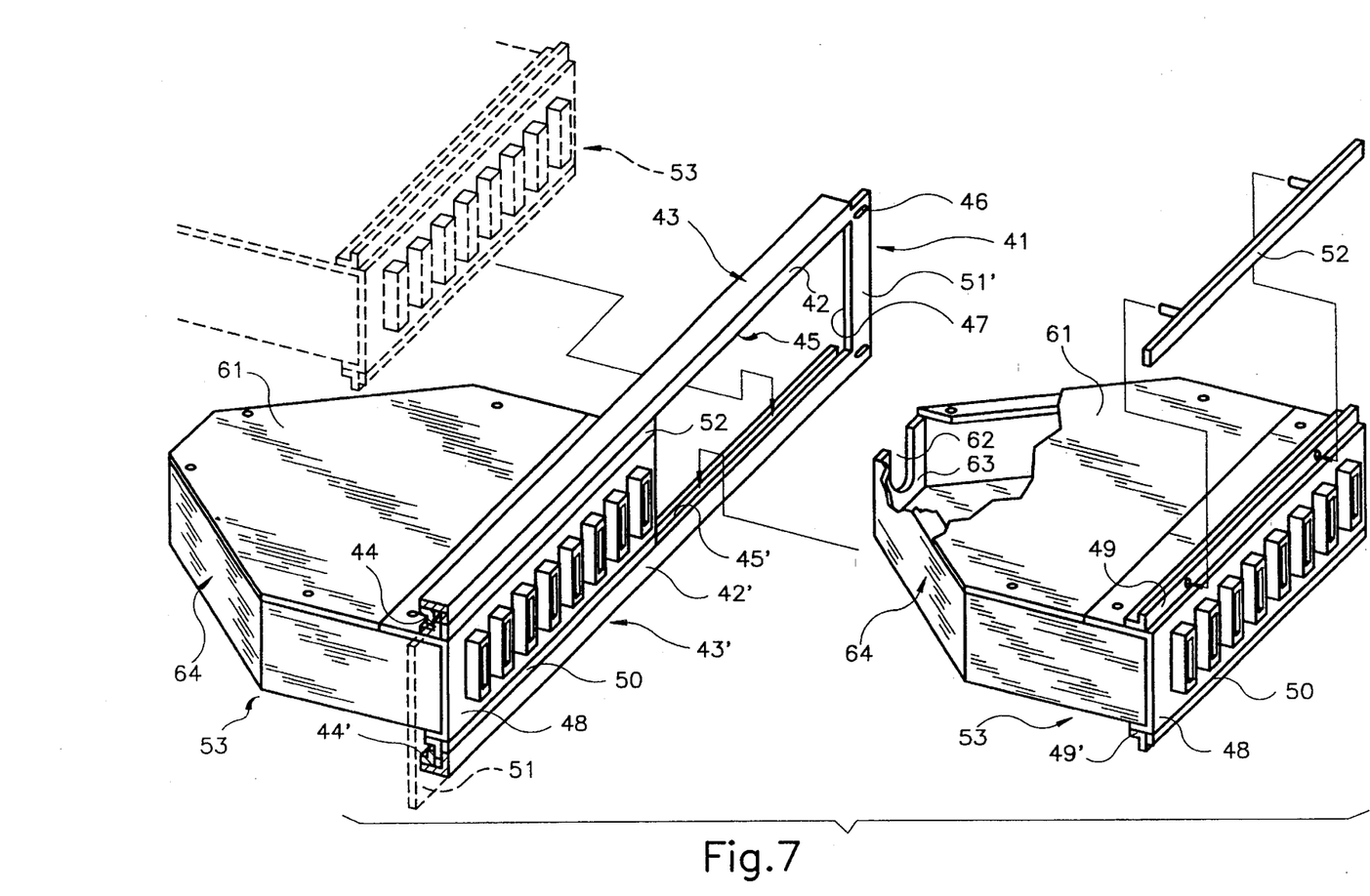
FIG. 7 is a perspective and exploded view of the frame of FIG. 6 with an inserted patch panel and distributor box and a patch panel with distributor box to be inserted, wherein the frame can be screwed to the perforated rails shown in FIG. 1.

FIGS. 5, 6, and 7 show a preferred exemplified embodiment, where the U-shaped rails or, respectively, the U-longitudinal openings are in this case part of a frame plate 41. Preferably, the U-shaped rails are an integral part of the frame plate 41. The frame plate 41 comprises substantially two horizontally running connection webs 42, 42', where the two horizontally running connection webs 42, 42' are connected with two vertically running connection webs 51, 51' to form a frame, and where the frame surrounds a rectangular recess 47. In each case, a web 54, 54', bent rearwardly at a right angle, is formed at the upper and lower horizontally running connection web 42, 42' for the formation of U-shaped rails 43, 43'. In each case, a rail 44, 44' is disposed at the inside of the webs 54, 54' and at a distance to the connection web 42, 42'. This rail 44, 44' is preferably an angle rail or L-strap, wherein the horizontally running arm is connected to the respective web 54, 54' (FIG. 5) such that the vertically running arm of the rail 44, 44' runs parallel to the connection webs 42, 42' under formation of in each case a U-shaped longitudinal opening 45, 45'. The longitudinal edges 55, 55', disposed facing each other, of the vertically running arms of the angle rails and L-strap 44, 44' project preferably over the longitudinal edges 56, 56', disposed facing each other, of the upper connection web 42 and of the lower connection web 42'.

The frame plate 41 is furnished with elongated holes 46, 46' (FIGS. 6, 7) in the four corners of the frame plate 41. The frame plate 41, for example, can be attached with the elongated holes 46, 46' at the vertical perforated rails 2, 2' of the distribution rack or patch panel cabinet 1 as shown in FIG. 1.

The patch panel 48 exhibits in a longitudinal direction on the top and at the bottom in each case a horizontally running arm 57, 58, which is bent at a right angle relative to the patch panel 48. A rail 49, 49' is in each case assembled and mounted to the horizontally running arm 57, 58. The rail 49, 49' is preferably an angle rail or L-strap with two longitudinal arms 59, 59', 60, 60', running at a right angle relative to each other. The vertically running longitudinal arms 59, 60 of the rails 49, 49' protrude in each case into the U-shaped, longitudinal openings 45, 45' such that the inner longitudinal edges 56, 56', 55, 55' of the connection webs 42, 42' of the frame plate 41 project over the patch panel 48 or, respectively, the vertically disposed longitudinal arms 59, 60 of the angle rails or L-straps 49, 49' in an assembled state of the patch panel 48. Eight elongated recesses are disposed within each patch panel 48. A support for an optical waveguide plug system is disposed in each case in the longitudinal recesses.

A distributor box 53 is mounted and assembled between the arms 57, 58 of the patch panel 48. In order to prevent removal of the patch panel 48 together with the thereon attached distributor box 53 after an insertion of the patch panel 48 into the frame plate 41, where the insertion can be performed from the front and from the rear, a blocking rail 52 is subsequently mounted, after the insertion of the patch panel 48 into the recess 47 of the frame plate 41, onto the outer side of the upper longitudinal arm 59 of the angle rail or L-strap 49. The blocking rail 52, which can be provided of different colors, is thus furnished with the width of the distance of the longitudinal edge 56 from the upper edge of the patch panel 48 or, respectively, of arm 57 of the patch panel 48.

The connection webs 42, 42' of the frame plate 41 or, respectively, the frame plate 41 itself, the blocking rail 52, as well as the patch panel 48 are in this case disposed in a vertical alignment, and for this reason the angle rails or L-straps 49, 49' are recessed rearwardly by the thickness of the material of the connection webs 42, 42'. In addition, a flat rail 50 can be mounted in vertical alignment with the patch panel 48 between the longitudinal edge 56' of the lower connection web 42' and the lower edge of the patch panel 48 or, respectively, of the arm 58 of the patch panel 48.

The distributor box 53 has a rearward, trapezoidally tapering part 64, which closes with a rear narrow faceplate 63. A longitudinal slot 62, open in upward direction, is disposed in the rear, narrow front face 63. A cable support of the trunk cable or feed cable 13, 14, inserted into the distributor box 53, can be plugged into the open elongated slot 62 for relief of the tension. The distributor box 53 can be closed with a cover 61. The individual lines of the trunk cable or feed cable 13, 14 are guided loosely within the distributor box 53 to the plug systems. The patch panels, the U-shaped rails, the frame plate as well as the distributor boxes can be produced of sheet metal or of plastic.

The present invention shows substantial commercial application and utility. In particular, the invention apparatus is suitable for the arrangement of patch panel, which support optical waveguide plug system, such as couplings and/or plugs and/or adapters and/or optical waveguide cables with or without distributor boxes and, in general, of insertion supports, preferably within a distribution rack or patch panel cabinet, in particular in 19-inch grid technology. The usefulness of the invention includes that the patch panels or, respectively, the distributor boxes or, respectively, the plug-in supports can be hung into the rails or, respectively, the frame from the rear or from the front without having to loosen any screws.

The flat rails 6, 7 can have a width which is from about 0.4 to 0.6 times the width of the patch panel 5. The blocking strip 8 can have a width which is from about 0.3 to 0.7 times the width of the flat rail 7 The arms 3', 3" of the upper U-shaped rail 3 can have a length which is from about 1.2 to 2.0 times the length of the arms 4', 4" of the lower U-shaped rail 4, and preferably the arms 3', 3" of the upper U-shaped rail 3 are from about 1.2 to 1.5 times the length of the arms 4', 4" of the lower U-shaped rail 4 The length of the arms 4', 4" of the lower U-shaped rail 4 can be from about 0.5 to 0.75 times the width of the flat rails 6, 7. The thickness of the flat rails 6, 7 can be from about 0.8 to 1.2 times the thickness of the patch panel 5.

The distribution rack or patch panel cabinet 1 can be constructed to contain, as shown in FIG. 3, twelve distributor boxes. Preferably, pairs of distributor boxes 12, 12' (FIG. 4) are arranged side by side. The distributor boxes 12, 12' can be furnished with distributor ports 122, 122', which allow a feed-through of a trunk cable 13, 14. A common support 117 can be provided for the cable rolls 15, 16 with the cable strands 17, 18. Thus, the distributor boxes 12, 12' can be connected to wound-up cable strands 17, 18 which are disposed on the common support 117. The common support 117 can be located behind the distributor boxes 12, 12' in the area between the distributor boxes 12, 12' such that the wound-up cable strands 17, 18 are spaced toward the canted sides adjoining of the distributor boxes 12, 12'.

The distributor box 12 can be constructed such that from about 0.3 to 0.6 of the total depth of the distributor box 12 is provided as a rectangular region immediately adjoining the front face of the distributor box 12. The rear area of the distributor box 12 can comprise from about 0.4 to 0.7 of the total depth of the distributor box 12. Said rear section is preferably provided as a symmetrical trapezoid, where the large face of the two parallel faces of the trapezoid is joining the rectangular section of the distributor box, and where the small face of the two parallel faces of the trapezoid forms the rear face of the distributor box. The angle of the symmetrical trapezoid can be from about 45 to 70 degrees relative to the two parallel sides of the trapezoid. Alternatively, the rear section of the distributor box can be formed as a section of a circle or as a semicircle. The width to height ratio of the distributor box can be from about 2.0 to 4.0 and is preferably from about 2.5 to 3.5.

It will be understood that each of the elements described above, or two or more together, may also find a useful application in other types of patch panel system configurations differing from the types described above.

While the invention has been illustrated and described as embodied in the context of an apparatus for the arrangement of patch panels, supporting optical waveguide plug systems, preferably within a distribution rack or patch panel cabinet, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for the arrangement of patch panels comprising a distribution rack and patch panel cabinet;

an upper horizontally running-shaped rail having two ends, wherein the upper U-shaped rail is furnished with two arms, directed downwardly, and with a longitudinal slot, open in downward direction and formed by the two downwardly directed arms, and with a first rail floor at a bottom of the longitudinal slot open in downward direction, and wherein the upper U-shaped rail is horizontally supported at the two ends with, the distribution rack and patch panel cabinet;

a lower horizontally running U-shaped rail having two ends, wherein the lower U-shaped rail is furnished with two arms, directed upwardly, and with a longitudinal slot, open in upward direction and formed by the two upwardly directed arms, and with a second rail floor at a bottom of the longitudinal slot open in upward direction, and wherein the lower U-shaped rail is horizontally supported at the two ends within the distribution rack and patch panel cabinet, wherein the upper horizontally running U-shaped rail and the lower horizontally running U-shaped rail are disposed facing each other with open sides of the longitudinal slots, wherein lower edges of the two arms directed downwardly and upper edges of the two arms directed upwardly are disposed facing each other, wherein the upper horizontally running U-shaped rail is disposed above the lower horizontally running U-shaped rail in a vertical direction;

patch panel having longitudinal edges are disposed with its longitudinal edge between the upper U-shaped rail the lower U-shaped rail;

a first flat rail fixedly disposed at a rear side of a lower part of the patch panel, and a second flat rail fixedly disposed at a rear side of an upper part of the patch panel, wherein a patch panel assembly is formed by the patch panel with the first flat rail and the second flat rail;

wherein the two arms directed downwardly of the upper U-shaped rail are longer than the two arms directed upwardly of the lower U-shaped rail and wherein the width of the patch panel assembly extending in a vertical direction is larger than an open distance between the lower edges of the two arms directed downwardly and the upper edges of the two arms directed upwardly, however, wherein the width of the patch panel extending in a vertical direction is smaller than an open distance of the first rail floor from the second rail floor;

a frame plate, wherein the upper U-shaped rail and the lower shaped rail are formed by parts of the frame plate, and wherein the frame plate exhibits a rectangular opening for receiving the patch panel;

wherein the frame plate is furnished with an upper connection web for forming the upper U-shaped rail and with a lower connection web for forming the lower U-shaped rail, wherein the upper connection web supports an upper web bent rearwardly at a right angle, wherein an upper angle rail is disposed inside the upper web under providing a distance the upper connection web and under formation of an upper U-shaped longitudinal opening, wherein the lower connection web supports a lower web bent rearwardly at a right angle, wherein a lower angle rail is disposed inside the lower web under providing a distance to the lower connection web and under formation of a lower U-shaped longitudinal opening.

2. The apparatus according to claim 1, further comprising a second patch panel having longitudinal edges and disposed with its longitudinal edges between the upper U-shaped rail and the lower U-shaped rail;

a third flat rail fixedly disposed at a lower part of the second patch panel, and a fourth flat rail fixedly disposed at an upper part of the second patch panel, wherein a patch panel assembly is formed by the second patch panel with the third flat rail and the fourth flat rail;

wherein the distribution rack and patch panel cabinet is produced in 19-inch rack technology, wherein the first patch panel and the second patch panel support optical waveguide plug systems including couplings and plugs end optical waveguide cables disposed within the distribution rack and patch panel cabinet.

3. The apparatus according to claim 1, wherein a longitudinal edge of the upper angle rail faces a longitudinal edge of the lower angle rail, wherein a longitudinal edge of the upper connection web faces a longitudinal edge of the lower connection web, wherein the longitudinal edge of the upper angle rail projects further downward than the longitudinal edge of the upper connection web, wherein the longitudinal edge of the lower angle rail projects further upward than the longitudinal edge of the lower connection web.

4. The apparatus according to claim 1, further comprising a distributor box disposed at the patch panel, wherein the distributor box is formed as a parallelepiped having a rear end, and wherein the distributor box includes a trapezoidal part, narrowing rearwardly at the rear end of the parallelepiped disposed remote from the patch panel as viewed from above, wherein the trapezoidal part is of a trapezoidal shape.

5. The apparatus according to claim 4, wherein the patch panel supports in each case on top of the patch panel an upper projecting arm and below the patch panel a lower projecting arm, wherein the upper projecting arm and the lower projecting arm are running longitudinally and bent at a right angle relative to an adjacent surface of the distributor box; further comprising an upper rail with an upper horizontally disposed longitudinal rail arm and with an upper vertically disposed longitudinal rail arm, wherein the upper horizontally disposed longitudinal rail arm and the upper vertically disposed longitudinal rail arm are disposed at a right angle to each other, wherein the upper horizontally disposed longitudinal rail arm is mounted on the upper projecting arm, wherein the upper vertically disposed longitudinal arm protrudes into the upper U-shaped rail, and wherein the upper vertically disposed longitudinal arm projects beyond longitudinal edges of the upper U-shaped rail;

a lower rail with a lower horizontally disposed longitudinal rail arm and with a lower vertically disposed longitudinal rail arm, wherein the lower horizontally disposed longitudinal rail arm and the lower vertically disposed longitudinal rail arm are disposed at a right angle to each other, wherein the lower horizontally disposed longitudinal rail arm is mounted on the lower projecting arm, wherein the lower vertically disposed longitudinal arm protrudes into the lower U-shaped rail, and wherein the lower vertically disposed longitudinal arm projects beyond longitudinal edges of the lower U-shaped rail; and wherein the distributor box is mounted between the upper projecting arm and the lower projecting arm.

6. The apparatus according to claim 1, further comprising vertical perforated rails disposed in a side-door region inside side wall of the distribution rack and patch panel cabinet, and wherein the upper U-shaped rail and the lower U-shaped rail are supported with their ends at the perforated rails.

7. The apparatus according to claim 6, further comprising a distributor box attached to the patch panel and including an elongated, upwardly open slot in a rear narrow faceplate for allowing insertion and for allowing tension relief of a cable support of a trunk cable or of a feed cable.

8. The apparatus according to claim 1, further comprising a distributor box attached to the patch panel;

a cable roll, wherein a cable coming from the distributor box is wound up on the cable roll, wherein the cable roll is disposed in the neighborhood of the distributor box within the distribution rack and patch panel cabinet.

9. The apparatus according to claim 8, further comprising additional cable rolls, wherein the additional cable rolls are provided for receiving trunk cables and/or jumper cables and are disposed within a space created by a trapezoidally shaped and rearwardly tapering formation of the distributor box within the distribution rack and patch panel cabinet.

10. The apparatus according to claim 1, wherein the second flat rail projects beyond an upper longitudinal edge of the patch panel, and a lower flat rail mounted to a lower edge of the patch panel, wherein the first flat rail projects beyond a lower longitudinal edge of the patch panel, wherein the combined width of the patch panel together with the second flat rail and the first flat rail is larger than the open distance between the second rail floor and the lower edges of the two arms directed downwardly, wherein the two arms directed downwardly are facing the two arms directed upwardly, however, wherein the combined width of the patch panel together with the second flat rail and the first flat rail is less than the open distance between the upper edges of the two arms directed upwardly and the first rail floor.

11. The apparatus according to claim 1, wherein the second flat rail projects beyond an upper longitudinal edge of the patch panel, and wherein the lower flat rail projects beyond a lower longitudinal edge of the patch panel, wherein a combined width of the patch panel together with the second flat rail and the first flat rail is larger than an open distance between the lower edges of the two arms directed downwardly and the upper edges of the two arms directed upwardly, wherein the two arms directed downwardly are facing the two arms directed upwardly, however, wherein the combined width of the patch panel together with the second flat rail and the first flat rail is less than an open distance between the first rail floor and the second rail floor.

12. An apparatus for the arrangement of patch panels comprising a distribution rack and patch panel cabinet;

an upper horizontally running U-shaped rail having two ends, wherein the upper U-shaped rail is furnished with two arms, directed downwardly, and with a longitudinal slot, open in downward direction and formed by the two downwardly direction arms, and with a first rail floor at a bottom of the longitudinal slot open in downward direction, and wherein the upper U-shaped rail is horizontally supported at the two ends within the distribution rack and patch panel cabinet;

a lower horizontally running U-shaped rail having two ends, wherein the lower U-shaped rail is furnished with two arms, directed upwardly, and with a longitudinal slot, open in upward direction and formed by the two upwardly directed arms, and with a second rail floor at a bottom of the longitudinal slot open in upward direction, and wherein the lower U-shaped rail is horizontally supported at the two ends within the distribution rack and patch panel cabinet, wherein the upper horizontally running U-shaped rail and the lower horizontally running U-shaped rail are disposed facing each other with open sides of the longitudinal slots, wherein lower edges of the two arms directed downwardly and upper edges of the two arms directed upwardly are disposed facing each other, wherein the upper horizontally running U-shaped rail is disposed above the lower horizontally running U-shaped rail in a vertical direction;

a patch panel having longitudinal edges and disposed with its longitudinal edges between the upper U-shaped rail and the lower U-shaped rail;

a first flat rail fixedly disposed at a rear side of a lower part of the patch panel, and a second flat rail fixedly disposed at a rear side of an upper part of the patch panel, wherein a patch panel assembly is formed by the patch panel with the first flat rail and the second flat rail;

wherein the two arms directed downwardly of the upper U-shaped rail are longer than the two arms directed upwardly of the lower U-shaped rails, and wherein the width of the patch panel assembly extending in a vertical direction is larger than an open distance between the lower edges of the two arms directed downwardly and the upper edges of the two arms directed upwardly, however, wherein the width of the patch panel extending in a vertical direction is smaller than an open distance of the first rail floor from the second rail floor;

a frame plate, wherein the upper U-shaped rail and the lower U-shaped rail are formed by parts of the frame plate, and wherein the frame plate exhibits a rectangular opening for receiving the patch panel;

a second patch panel having longitudinal edges and received with its longitudinal edges between the upper U-shaped rail and the lower U-shaped rail;

a third flat rail fixedly disposed at a rear surface of a lower part of the second patch panel, and a fourth flat rail fixedly disposed at a rear surface of an upper part of the second patch panel, wherein a patch panel assembly is formed by the second patch panel with the third flat rail and the fourth flat rail;

wherein the distribution rack and patch panel cabinet is produced in 19-inch rack technology, wherein the first patch panel and the second patch panel support optical waveguide plug systems including couplings and plugs and optical waveguide cables disposed within the distribution rack and patch panel cabinet;

a first distributor box disposed at the first patch panel, wherein the first distributor box is formed as a parallelepiped having a rear end, and wherein the first distributor box includes a part, narrowing rearwardly at the rear end of the parallelepiped disposed remote from the first patch panel as viewed from above, wherein the part is of a trapezoidal shape;

a second distributor box disposed at the second patch panel, wherein the second distributor box is formed as a parallelepiped having a rear end, and wherein the second distributor box includes a part, narrowing rearwardly at the rear end of the parallelepiped disposed remote from the second patch panel as viewed from above, wherein the part is of a trapezoidal shape;

wherein the first patch panel and the second patch panel and the first distributor box and the second distributor box, respectively, are disposed next to each other in the upper U-shaped rail and the coordinated lower U-shaped rail, wherein eight optical waveguide plugs and eight optical waveguide couplings, respectively, are disposed within each patch panel.

13. An apparatus for the arrangement of patch panels comprising a distribution rack and patch panel cabinet;

an upper horizontally running U-shaped rail having two ends, wherein the upper U-shaped rail is furnished with two arms, directed downwardly, and with a longitudinal slot, open in downward direction and formed by the two downwardly directed arms, and with a first rail floor at a bottom of the longitudinal slot open in downward direction, and wherein the upper U-shaped rail is horizontally supported at the two ends within the distribution rack and patch panel cabinet;

a lower horizontally running U-shaped rail having two ends, wherein the lower U-shaped rail is furnished with two arms, directed upwardly, and with a longitudinal slot, open in upward direction and formed by the two upwardly directed arms, and with a second rail for floor at a bottom of the longitudinal slot open in upward direction, and wherein the lower U-shaped rail is horizontally supported at the two ends within the distribution rack and patch panel cabinet, wherein the upper horizontally running U-shaped rail and the lower horizontally running U-shaped rail are disposed facing each other with open sides of the longitudinal slots, wherein lower edges of the two arms directed downwardly and upper edges of the two arms directed upwardly are disposed facing each other, wherein the upper horizontally running U-shaped rail is disposed above the lower horizontally running U-shaped rail in a vertical direction;

a patch panel having longitudinal edges and disposed with its longitudinal edges between the upper U-shaped rail and the lower U-shaped rail;

a first flat rail fixedly disposed at a rear side of a lower part of the patch panel, and a second flat rail fixedly disposed at a rear side of an upper part of the patch panel, wherein a patch panel assembly is formed by the patch panel with the first flat rail and the second flat rail;

wherein the two arms directed downwardly of the upper U-shaped rail are longer than the two arms directed upwardly of the lower U-shaped rails, and wherein the width of the patch panel assembly extending in a vertical direction is larger than an open distance between the lower edges of the two arms directed downwardly and the upper edges of the two arms directed upwardly, however, wherein the width of the patch panel extending in a vertical direction is smaller than an open distance of the first rail floor from the second rail floor;

wherein the second flat rail projects beyond an upper longitudinal edge of the patch panel, and wherein the lower flat rail projects beyond a lower longitudinal edge of the patch panel, wherein a combined width of the patch panel together with the second flat rail and the first flat rail is larger than an open distance between the lower edges of the two arms directed downwardly and the upper edges of the two arms directed upwardly, wherein the two arms directed downwardly are facing the two arms directed upwardly, however, wherein the combined width of the patch panel together with the second flat rail and the first flat rail is less than an open distance between the first rail floor and the second rail floor;

a removable blocking strip, placed on the second flat rail between an upper edge of the patch panel and a lower edge of an outer front arm of the two arms directed downwardly of the upper U-shaped rail, for obtaining a solid support for the patch panel and distribution boxes, respectively, disposed within the distribution rack and patch panel cabinet and when desired for allowing an easy removal of the patch panel and distributor boxes, respectively, from the distribution rack and patch panel cabinet.

14. The apparatus according to claim 13, further comprising a second patch panel having longitudinal edges and disposed with its longitudinal edges between the upper U-Shaped rail and the lower U-shaped rail;

a third flat rail fixedly disposed at a lower part of the second patch panel, and a fourth flat rail fixedly disposed at an upper part of the second patch panel, wherein a patch panel assembly is formed by the second patch panel with the third flat rail and the fourth flat rail;

wherein the distribution rack and patch panel cabinet is produced in 19-inch rack technology, wherein the first patch panel and the second patch panel support optical waveguide plug systems including couplings and plugs and optical waveguide cables disposed within the distribution rack and patch panel cabinet.

15. The apparatus according to claim 13, wherein a longitudinal edge of the upper angle rail faces a longitudinal edge of the lower angle rail, wherein a longitudinal edge of the upper connection web faces a longitudinal edge of the lower connection web, wherein the longitudinal edge of the upper angle rail projects further downward than the longitudinal edge of the upper connection web, wherein the longitudinal edge of the lower angle rail projects further upward than the longitudinal edge of the lower connection web.

16. The apparatus according to claim 13, further comprising a distributor box disposed at the patch panel, wherein the distributor box is formed as a parallelepiped having a rear end, and wherein the distributor box includes a trapezoidal part, narrowing rearwardly at the rear end of the parallelepiped disposed remote from the patch panel as viewed from above, wherein the trapezoidal part is of a trapezoidal shape.

17. The apparatus according to claim 13, further comprising vertical perforated rails disposed in a side wall of the distribution rack and patch panel cabinet, and wherein the upper U-shaped rail and the lower U-shaped rail are supported with their ends at the perforated rails.

18. The apparatus according to claim 13, further comprising a distributor box attached to the patch panel; a cable roll, wherein a cable coming from the distributor box is wound up on the cable roll, wherein the cable roll is disposed in the neighborhood of the distributor box within the distribution rack and patch panel cabinet.

19. The apparatus according to claim 13 wherein the second flat rail projects beyond an upper longitudinal edge of the patch panel, and a lower flat rail mounted to a lower edge of the patch panel, wherein the first flat rail projects beyond a lower longitudinal edge of the patch panel, wherein the combined width of the patch panel together with the second flat rail and the first flat rail is larger than the open distance between the second rail floor and the lower edges of the two arms directed downwardly, wherein the two arms directed downwardly are facing the two arms directed upwardly, however, wherein the combined width of the patch panel together with the second flat rail and the first flat rail is less than the open distance between the upper edges of the two arms directed upwardly and the first rail floor.

20. An apparatus for the arrangement of patch panels (5, 48) within a distribution rack and patch panel cabinet (1) and produced in 19-inch rack technology, wherein two horizontally running U-shaped rails (3, 4) are furnished with longitudinal slots (30''', 40'''), wherein said longitudinal slots (30''', 40''') are disposed facing each other with the openings, wherein one of the two U-shaped rails (3,4) is disposed above the other of the two U-shaped rails (3, 4) in a vertical direction, wherein the U-shaped rails (3, 4) are horizontally supported at their ends within the distribution rack and patch panel cabinet (1), wherein the patch panel (5) is received with its longitudinal edges between the U-shaped rails (3, 4), wherein arms (3', 3'') of the upper U-shaped rails (3) are longer than arms (4', 4'') of the lower U-shaped rails (4), and wherein the width (a) of the patch panel (5, 48) is larger than the open distance (b) between the two outermost edges (30, 40), disposed facing each other, of the arms (3, 3', 4, 4') of the upper and lower U-shaped rails (3, 4), however smaller than the open distance (c) of the rail floors (30', 40') from each other;

wherein the U-shaped rails (43, 43') are formed by integral parts of a frame plate (41) wherein the frame plate (41) exhibits a rectangular opening (47) for receiving the patch panel (48);

wherein the frame plate (41) is furnished with an upper connection web (42) and with a lower connection web (42') for forming the U-shaped rails (43, 43'), wherein the connection webs (42, 42') support in each case a web (54, 54') bent rearwardly at a right angle, wherein in each case an angle rail (44, 44') is disposed directly inside at the webs (54, 54') while there is a distance between the angle rail (44, 44') and the connection web (42, 42') and wherein the angle rail (44, 44') forms together with the connection web (42, 42') U-shaped longitudinal openings (45, 45'), wherein the longitudinal edges (55, 55'), disposed facing each other, of the angle rails (44, 44') project over the longitudinal edges (56, 56'), disposed facing each other, of the upper connection web (42) and of the lower connection web (42').

21. The apparatus according to claim 20, wherein a distributor box (12, 12', 53) is disposed at the patch panel (5, 48), wherein the distributor box (12, 12', 53) is formed as a parallelepiped, and wherein the distributor box (12, 12', 53) supports a trapezoidal part (64), tapering towards the rear end of the parallelepiped disposed remote from the patch panel (5, 48) as viewed from above, wherein the trapezoidal part is of a trapezoidal shape.

22. The apparatus according to claim 20, further comprising vertical perforated rails (2, 2') disposed in a side wall of the distribution rack and patch panel cabinet (1), and wherein the U-shaped rails (3, 4) are supported with their ends at the perforated rails (2, 2'), wherein a distributor box defines in a rear narrow faceplate (63) an elongated, upwardly open slot (62), for insertion and for tension relief of a cable support of a trunk cable or of a feed cable (13, 14).

23. The apparatus according to claim 20, wherein the two patch panels (5) or, respectively, two distributor boxes (12, 12') are disposed next to each other in two coordinated U-shaped rails (3, 4), wherein eight optical waveguide plugs or, respectively, eight optical waveguide couplings are disposed within each patch panel (5).

24. The apparatus according to claim 20, wherein the cables (13, 14) coming from the distributor boxes (12, 12', 53) are wound up on cable rolls (15, 16), where the cable rolls (15, 16) are disposed in the neighborhood of the distributor boxes (12, 12') within the distribution rack and patch panel cabinet (1);

wherein further cable rolls (19, 19', 20, 20', 21, 21') are disposed within a space created by a trapezoidally shaped and rearwardly tapering part of the distributor boxes (12, 12', 53) within the distribution rack and patch panel cabinet (1).

25. An apparatus for the arrangement of patch panels (5, 48) within a distribution rack and patch panel cabinet (1) and produced in 19-inch rack technology, wherein two horizontally running U-shaped rails (3, 4) are furnished with longitudinal slots (30''', 40'''), wherein said longitudinal slots (30''', 40''') are disposed facing each other with the openings, wherein one of the two U-shaped rails (3,4) is disposed above the other of the two U-shaped rails (3, 4) in a vertical direction, wherein the U-shaded rails (3, 4) are horizontally supported at their ends within the distribution rack end patch panel cabinet (1), wherein the patch panel (5) is received with its longitudinal edges between the U-shaped rails (3, 4), wherein arms (3', 3'') of the upper U-shaped rails (3) are longer than arms (4', 4'') of the lower U-shaped rails (4), and wherein the width (a) of the patch panel (5, 48) is larger than the open distance (b) between the two outermost edges (30, 40), disposed facing each other, of the arms (3, 3', 4, 4') of the upper and lower U-shaped rails (3, 4), however smaller than the open distance (c) of the rail floors (30', 40') from each other;

wherein the U-shaped rails (43, 43') are formed by integral parts of a frame plate (41), wherein the frame plate (41) exhibits a rectangular opening (47) for receiving the patch panel (48);

wherein the patch panel (48) supports arms (57, 58) on top and bottom of the patch panel (48), running longitudinally and bent at a right angle, wherein to each arm of the arms (57, 58) is mounted a rail (49, 49') with two longitudinal arms (59, 59', 60, 60') disposed at a right angle to each other, wherein vertically running longitudinal arms (59, 60) of the longitudinal arms (59, 59', 60, 60') protrude into the U-shaped longitudinal openings (45, 45'), and wherein the longitudinal arms (59, 60) project over the inner longitudinal edges (56, 56', 55, 55') of the frame plate (41), wherein the distributor box (53) is mounted between the arms (57, 58).

26. The apparatus according to claim 25, wherein a distributor box (12, 12', 53) is disposed at the patch panel (5, 48), wherein the distributor box (12, 12', 53) is formed as a parallelepiped, and wherein the distributor box (12, 12', 53) supports a trapezoidal part (64), tapering towards the rear end of the parallelepiped disposed remote from the patch panel (5, 48) as viewed from above, wherein the trapezoidal part (61) is of a trapezoidal shape.

27. The apparatus according to claim 25, further comprising vertical perforated rails (2, 2') disposed in a side wall of the distribution rack and patch panel cabinet (1), and wherein the U-shaped rails (3, 4) are supported with their ends at the perforated rails (2, 2'), wherein a distributor box defines in a rear narrow faceplate (63) an elongated, upwardly open slot (62), for insertion and for tension relief of a cable support of a trunk cable or of a feed cable (13, 14).

28. An apparatus for the arrangement of patch panels (5, 48) within a distribution rack and patch panel cabinet (1) and produced in 19-inch rack technology, wherein two horizontally running U-shaped rails (3, 4) are furnished with longitudinal slots (30''', 40'''), wherein said longitudinal slots (30''', 40''') are disposed facing each other with the openings, wherein one of the two U-shaped rails (3,4) is disposed above the other of the two U-shaped rails (3, 4) in a vertical direction, wherein the U-shaped rails (3, 4) are horizontally supported at their ends within the distribution rack and patch panel cabinet (1), wherein the patch panel (5) is received with its longitudinal edges between the U-shaped rails (3, 4), wherein arms (3', 3'') of the upper U-shaped rails (3) are longer than arms (4', 4'') of the lower U-shaped rails (4), and wherein the width (a) of the patch panel (5, 48) is larger than the open distance (b) between the two outermost edges (30, 40), disposed facing each other, of the arms (3, 3', 4, 4') of the upper and lower U-shaped rails (3, 4), however smaller than the open distance (c) of the rail floors (30', 40') from each other;

wherein flat rails (6, 7) are mounted to a top of the patch panel and to a bottom of the patch panel (5), wherein the flat rails (6, 7) are attached to a rear surface of the patch panel and project over the longitudinal edges of the patch panel (5), wherein the width (a) of the patch panel (5) together with the flat rails (6, 7) is larger than the open distance (b) of the two outer edges (30, 40), disposed facing each other, of the arms (3, 3', 4, 4') of the upper and lower U-shaped rails (3, 4), however, less than the open distance (c) of the rail floors (30', 40') from each other;

wherein at least a removable blocking strip (8) is placed on at upper flat rail (7) between the upper edge of the patch panel (5) and the lower edge (30) of the outer, door-side arm (3') of the upper U-shaped rail (3) and for a solid support for the patch panel (5) or, respectively, of distributor boxes (12, 12') within the distribution rack and patch panel cabinet (1) and for allowing an easy removal of the patch panel (5) or, respectively, distributor boxes (12, 12') from within the distribution rack and patch panel cabinet (1).

29. An apparatus the arrangement of patch panels comprising a distribution rack and patch panel cabinet;

an upper horizontally running U-shaped rail having two ends, wherein the upper U-shaped rail is furnished with two arms, directed downwardly, and with a longitudinal slot, open in downward direction and formed by the two downwardly directed arms, and with a first rail floor at a bottom of the longitudinal slot open in downward direction, and wherein the upper U-shaped rail is horizontally supported at the two ends within the distribution rack and patch panel cabinet;

a lower horizontally running U-shaped rail having two ends, wherein the lower U-shaped rail is furnished with two arms, directed upwardly, and with a longitudinal slot, open in upward direction and formed by the two upwardly directed arms, and with a second rail floor at a bottom of the longitudinal slot open in upward direction, and wherein the lower U-shaped rail is horizontally supported at the two ends within the distribution rack and patch panel cabinet, wherein the upper horizontally running U-shaped rail and the lower horizontally running U-shaped rail are disposed facing each other with open sides of the longitudinal slots, wherein lower edges of the two arms directed downwardly and upper edges of the two arms directed upwardly are disposed facing each other, wherein the upper horizontally running U-shaped rail is disposed above the lower horizontally running U-shaped rail in a vertical direction;

a patch panel having longitudinal edges and disposed with its longitudinal edges between the upper U-shaped rail and the lower U-shaped rail;

a first flat rail fixedly disposed at a rear side of a lower part of the patch panel, and a second flat rail fixedly disposed at a rear side of an upper part of the patch panel, wherein a patch panel assembly is formed by the patch panel with the first flat rail and the second flat rail;

wherein the two arms directed downwardly of the upper U-shaped rail are longer then the two arms directed inwardly of the lower U-shaped rails, and wherein the width of the patch panel assembly extending in a vertical direction is larger than an open distance between the lower edges of the two arms directed downwardly and the upper edges of the two arms directed upwardly, however, wherein the width of the patch panel extending in a vertical direction is smaller than an open distance of the first rail floor from the second rail floor;

a frame plate, wherein the upper U-shaped rail and the lower U-shaped rail are formed by parts of the frame plate, and wherein the frame plate exhibits a rectangular opening for receiving the patch panel;

a second patch panel having longitudinal edges and received with its longitudinal edges between the upper U-shaped rail and the lower U-shaped rail;

a third flat rail fixedly disposed at a rear surface of a lower part of the second patch panel, and a fourth flat rail fixedly disposed at a rear surface of an upper part of the second patch panel, wherein a patch panel assembly is formed by the second patch panel with the third flat rail and the fourth flat rail;

wherein the distribution rack and patch panel cabinet is produced in 19-inch rack technology, wherein the first patch panel and the second patch panel support optical waveguide plug systems including couplings and plugs and optical waveguide cables disposed within the distribution rack and patch panel cabinet;

a first distributor box disposed at the first patch panel, wherein the first distributor box is formed as a parallelepiped having a rear end, and wherein the first distributor box includes a part, narrowing rearwardly at the rear end of the parallelepiped disposed remote from the first patch panel as viewed from above, wherein the part is of a trapezoidal shape;

a second distributor box disposed at the second patch panel, wherein the second distributor box is formed as a parallelepiped having a rear end, and wherein the second distributor box includes a part, narrowing rearwardly at the rear end of the parallelepiped disposed remote from the second patch panel as viewed from above, wherein the part is of a trapezoidal shape.

* * * * *